J. G. KENNEDY.
NUT BLANCHER.
APPLICATION FILED SEPT. 8, 1919.
1,362,252.
Patented Dec. 14, 1920.
4 SHEETS—SHEET 3.
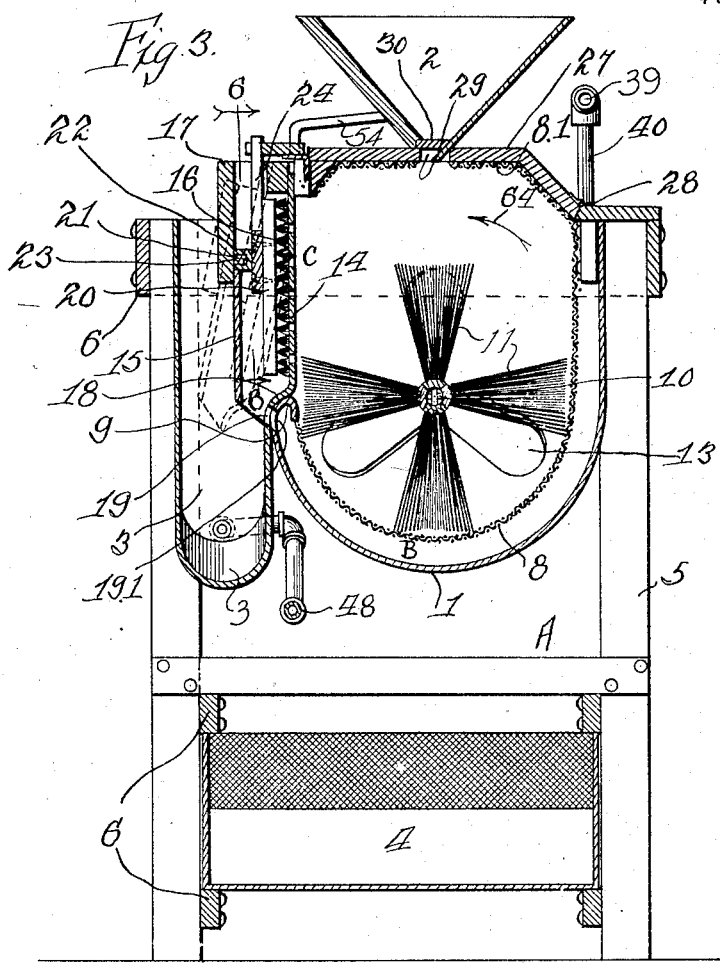
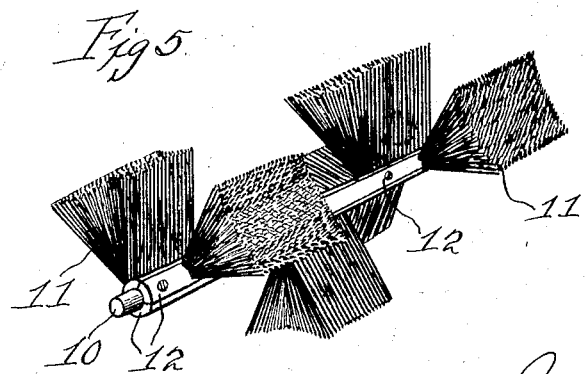
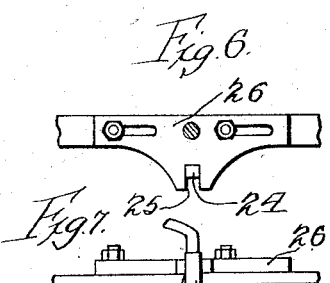

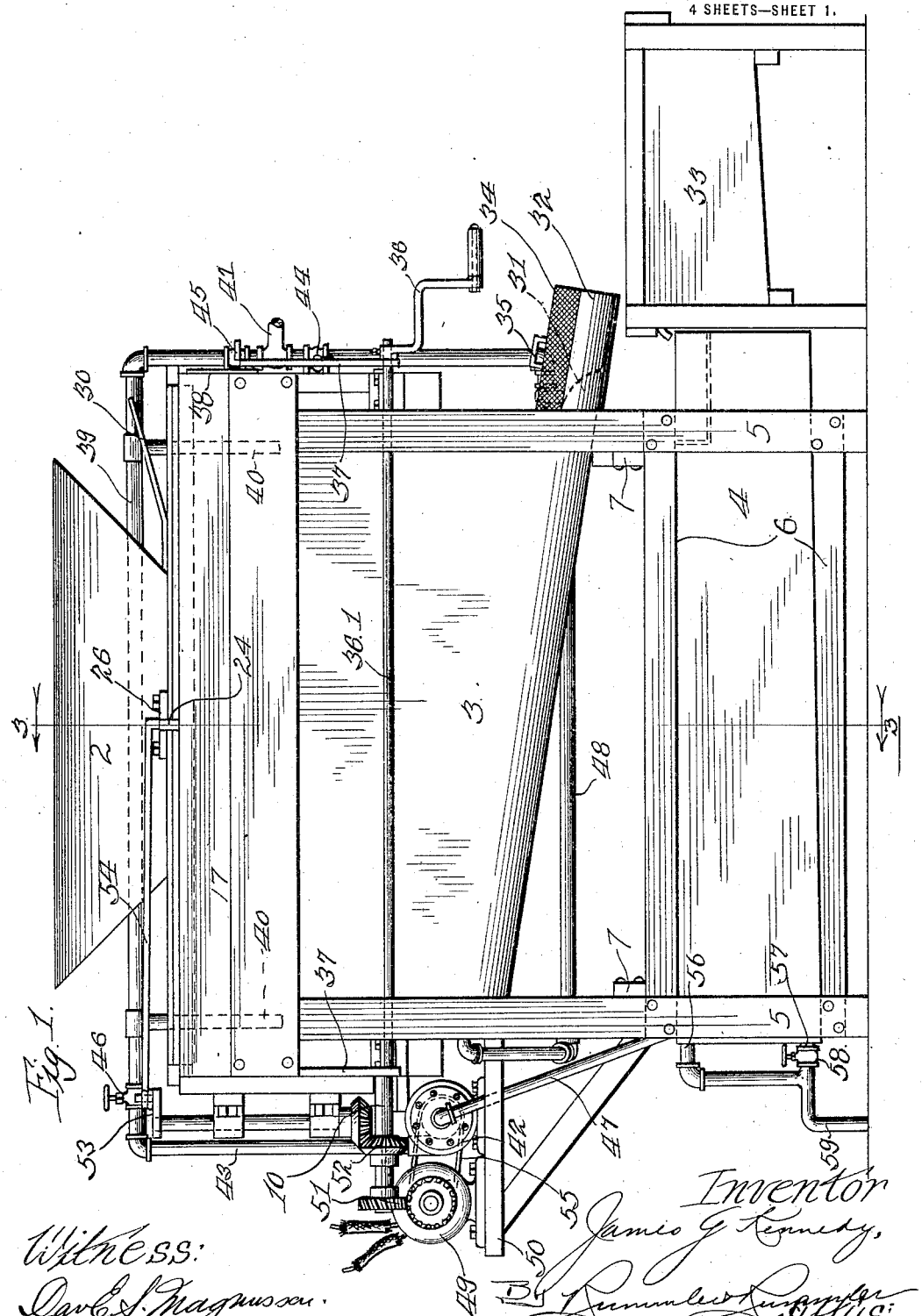

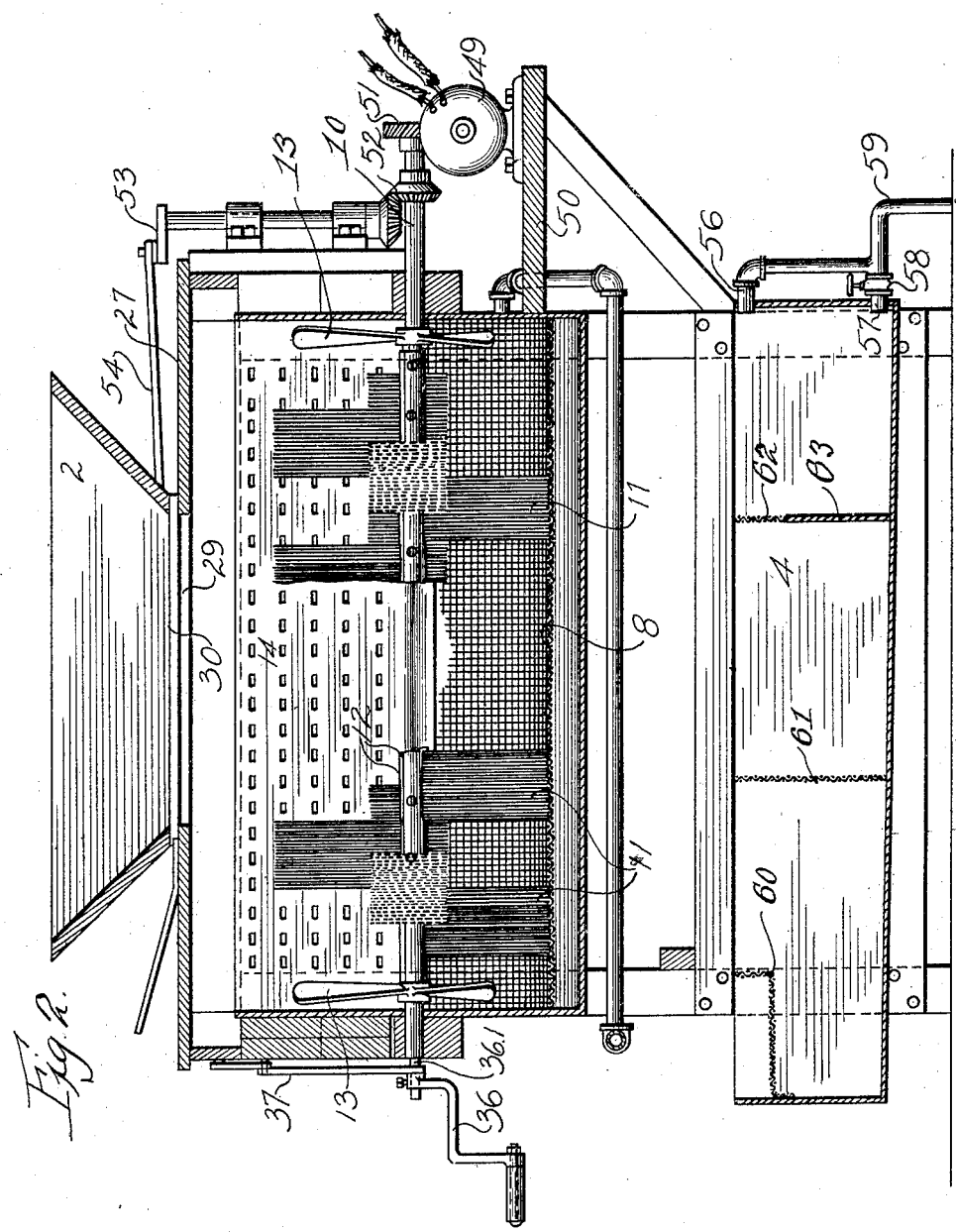

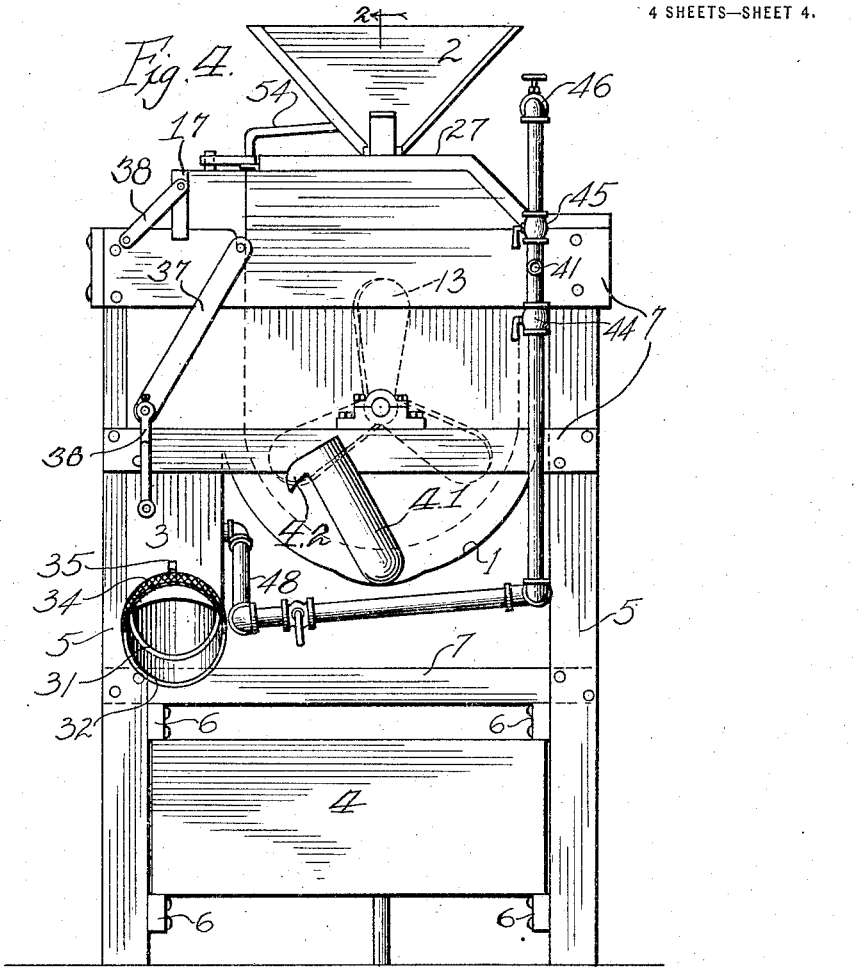
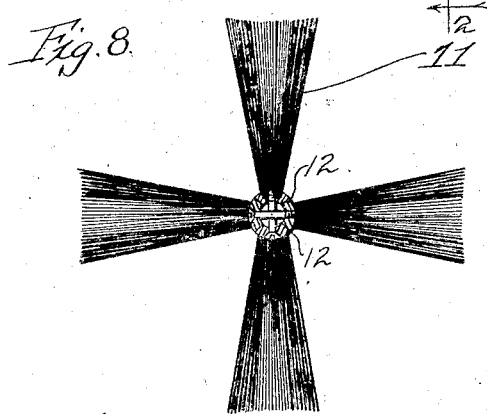
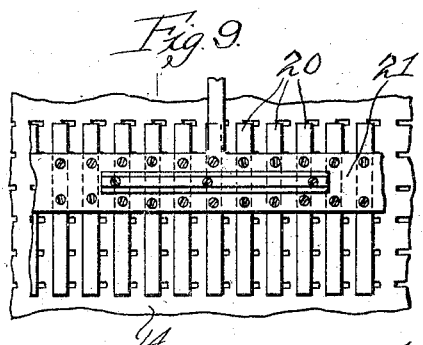

UNITED STATES PATENT OFFICE.

JAMES G. KENNEDY, OF CHICAGO, ILLINOIS, ASSIGNOR OF ONE-HALF TO WILLIAM H. BROWN, OF CHICAGO, ILLINOIS.

NUT-BLANCHER.

1,362,252.   Specification of Letters Patent.   Patented Dec. 14, 1920.

Application filed September 8, 1919.   Serial No. 322,330.

*To all whom it may concern:*

Be it known that I, JAMES G. KENNEDY, a citizen of the United States of America, and a resident of Chicago, county of Cook, and State of Illinois, have invented certain new and useful Improvements in Nut-Blanchers, of which the following is a specification.

The main objects of this invention are to provide an improved nut-blanching machine designed to blanch nuts by what is technically known as the "wet" method; to provide improved mechanism for removing the hulls from the kernels; to provide improved means for agitating the nuts in the hulling compartment so as to insure their being brought into contact with the hulling mechanism; to provide improved means for separating the hulls from the kernels; to provide improved means for circulating water through the hulling mechanism; to provide improved means for discharging the blanched nuts from the hulling mechanism; and to provide an improved machine of this kind which is simple and inexpensive in construction and economical to operate, and which will remove the hulls from the kernels with the minimum amount of splitting of the kernels.

An illustrative embodiment of the invention is shown in the accompanying drawings, in which—

Figure 1 is a side elevation of a nut-blanching machine constructed in accordance with this invention.

Fig. 2 is a longitudinal sectional elevation of the same.

Fig. 3 is a transverse sectional elevation taken on the line 3—3 of Fig. 1.

Fig. 4 is a front end elevation of the machine.

Fig. 5 is a perspective view of the cylindrical-shaped brush which forms a part of the hulling mechanism.

Figs. 6 and 7 are enlarged detail views of the means by which the brush which forms a part of the hull-separating mechanism is reciprocated.

Fig. 8 is an end elevation of the brush shown in Fig. 5.

Fig. 9 is an enlarged fragmentary detail in elevation of a part of the hull-separating mechanism.

The specific embodiment herein illustrated is constructed for use as a peanut-hulling or blanching machine, and comprises a frame A which supports a tank 1 within which the hulling mechanism B is arranged. Above the tank 1 is supported a hopper 2 from which the nuts are admitted to the hulling mechanism B, and at the side is arranged a chute 3 through which the hulled or blanched nuts are discharged. Below the tank 1 is arranged a second tank or reservoir adapted to contain a quantity of water which may be circulated through the tank.

The frame A, as herein shown, is made up of corner posts 5 and a series of side rails 6 and end rails 7 upon which the several parts of the device are supported. Although the frame in the machine herein shown is of wood construction, it will be understood that the same arrangement of parts may be used in constructing the frame from metal.

The tank 1 is formed of sheet metal with a semi-circular bottom and vertically disposed sides. One of the vertical sides is integral with the bottom and extends to the top of the frame. The other side is a separate piece from the part constituting the bottom of the tank and rests upon a ledge 9. This separate side forms a part of the hull-separating means, which will be more fully hereinafter described. The tank 1 is suspended within the frame A near the top thereof.

The hulling mechanism B comprises essentially two parts, hull-removing means for removing the hulls from the kernels, and hull-separating means for facilitating the separation of the hulls and kernels after the hulls have been removed from the kernels. The elements which make up these two different sets of means will now be more fully described.

The hull-removing means comprises a screen 8 concentrically arranged within the tank 1 and spaced a short distance away from the sides thereof. At one side this screen terminates adjacent to the ledge 9, and at the other side it extends upwardly substantially parallel to the adjacent vertical side of the tank. A piece of screen 8.1, of the kind as used for the screen 8, is secured to the under side of the cover 27 of the tank.

A shaft 10 is journaled on the tank on an axis coincident with the axis of the bottom of the tank 1 and carries a cylindrical-shaped brush. This brush is made up of a plurality of sector-shaped sections 11 which are secured together in sets and spaced apart axially. This is preferably accomplished by securing several of the sections, depending upon the length of the machine, to bars or plates 12 (see Fig. 5). The spacing of the sector-shaped sections is different on different plates, so that when the plates are secured together on the shaft 10, the brush sections are spaced apart axially and radially substantially in the form of a spiral, with the adjacent brush sections slightly overlapping each other. As will be more clearly observed from Figs. 3 and 8, the bristles along the outer edges of the brush sections 11 are slightly longer than and not so large as those along the middle. The mounting of the shaft 10 carrying these brush sections is such that the thicker and stiffer bristles along the middle of the sections have their ends spaced slightly away from the screen 8, whereas the thinner and more flexible bristles along the outer edges of the sections positively engage the screen. The purpose of this construction and arrangement of the brush sections will be more fully hereinafter explained.

In order to insure the nuts being circulated through the tank and kept in the paths of the brush sections 11 and thereby prevent an accumulation of nuts at the ends or other parts of the machine, agitators in the form of propeller blades 13 are secured to the shaft 10 at both ends of the tank 1. These propeller blades are shaped so as to force the water and the nuts inwardly toward the middle of the brush.

The hull-separating action of the brush sections 11 and the screen 8 is supplemented by auxiliary means C arranged at and comprising a part of one side of the tank 1. Said means includes a foraminous plate 14 and an imperforate plate 15 between which is mounted a brush 16. The plates 14 and 15 are secured together in spaced relation by a suitable framework 17, the lower end of the plate 14 being offset so as to provide a seat 18 adapted to rest upon the ledge 9 for supporting means in place with the plate 14 in substantially tangential alinement with the adjacent end of the screen 8. The lower end of the plate 15 is inclined inwardly toward the plate 14 and the two plates are secured together along their lower edges. Communication of the space between the plates 14 and 15 with the tank 1 below the screen 8 is afforded by slots or apertures 19, formed in the lower part of the plate 14, which registers with apertures 19.1 formed in the adjacent part of the tank.

The brush 16 comprises a plurality of elongated members 20 secured to a plate 21 and having bristles projecting therefrom into contact with the outer face of the foraminous plate 14. The brush is reciprocatingly supported in place by means of a channel piece 22 secured to the plate 21 and slidingly embracing a bar 23 secured to the frame 17.

An arm 24 extends upwardly from the plate 21 and is seated in a notch in a member 26 which is shiftably mounted on a suitable part of the frame A above the frame 17.

The hopper 2 is supported on a cover 27 hinged at 28 to the frame A and constituting a closure for the tank 1. The sides and ends of the hopper are tapered toward a slot or mouth 29 formed in the top 27, which mouth is adapted to be opened and closed by a plate 30 slidably mounted on the cover 27.

The chute 3 is of elongated cross section and extends throughout the entire length of the tank, being tapered from one end to the other. On the inner side, the chute is secured to the adjacent side of the tank 1 near the ledge 9, whereas the outer side of the chute extends to the top of the frame A.

The chute terminates in a spout 31 and is provided with an extension 32 whereby the chute may be caused to discharge into the receptacle 33 or into the reservoir 4. To that end, the extension 32 is in the form of a cylindrical member, one-half of which is formed of sheet metal, and the other half is formed of screen material 34. A handle 35 is secured to the extension 32, whereby it may be rotated on the spout 31 to occupy the position shown in Fig. 1, whereupon the chute 3 will discharge into the receptacle 33, or it may be rotated so that the screen part 34 is on the bottom, and the chute 3 will discharge liquid or small particles into the receptacle 4.

In order to place the chute 3 in communication with the tank 1 and enable the hulled or blanched nuts to be directed into the receptacle 33, the auxiliary hull-separating means, comprising the plates 14 and 15 and the frame 17, is adapted to be swung into the position shown in dotted outline in Fig. 3. The swinging of this means or side section is accomplished by the medium of a crank 36 secured to a shaft 36.1, from the opposite end of which links 37 connect with the frame 17. Auxiliary links 38 connect the frame 17 with an adjacent part of the frame A. The arrangement of the crank 36 and links 37 is such that by turning the crank 36, the frame 17 is first elevated so as to disengage the seat 18 and ledge 9 and then shift the frame so as to move the lower end of the side section toward the outer side of the chute 3.

Supply and circulation of water is obtained by means of a pipe line 39 extending across the top of the frame and having inlets 40 extending downward into the tank between the screen 8 and the adjacent side wall of said tank. This pipe line is arranged so as to be connected either to the city water system through a branch 41, or to a circulating pump 42 through a branch 43. Suitable valves 44, 45, and 46 are arranged in the pipe line for the purpose of controlling the flow of water, depending upon whether the same is obtained from the city water pressure or through the pump 42. In case the circulating pump 42 is used, the water is obtained from the reservoir 4 through the feed pipe 47. A branch pipe 48 leads from the line 39 into the upper rear end of the chute 3 for the purpose of flushing the same. The water outlet for the tank 1 comprises a pipe 4.1 which connects at the bottom of the tank in the interior thereof and extends up part way to the shaft 10 (Fig. 4). This pipe is slightly inclined and provided with a lip 4.2 which directs the water into the reservoir 4.

The power unit for operating the machine comprises a motor 49 mounted on a base 50 and connected by gearing 51 to the shaft 10, which carries the brush sections 11. Other gearing 52 connects the power unit with a crank 53 from which a link 54 leads to the reciprocating member 26. A belt 55 or other suitable gearing connects the motor 49 with the pump 42.

The reservoir 4 comprises a tank of rectangular form supported on the lowermost side rails 6 of the frame A. This reservoir at the forward end extends out far enough to catch the water which flows from the tank outlet 4.1. At the other end it is provided with drains 56 and 57, the former of which is connected to the top of the tank and constitutes the overflow drain, and the latter of which connects with the bottom of the tank and is controlled by a valve 58. From these drains a pipe 59 leads to some suitable outlet connecting with the sewer. Within the reservoir are arranged a screen trap 60 and screen strainers 61 and 62. The screen 61 extends throughout the entire depth of the reservoir, whereas the screen 62 extends only a part of the way down to the top of a partition 63. The receptacle 33 may be of any desired form or construction suitable to receive the blanched or hulled peanuts from the chute 3 and drain the same preparatory to their being dried and made ready for use or sale.

The operation of the device herein shown is substantially as follows:

The hulling of the nuts is effected by agitating them in the compartment, turning them around so that they are caused to strike against the sides of the screen 8 and against the brush sections 11. The water tends first to weaken the hull so as to facilitate separation of the hull from the kernel, and at the same time tends to toughen the kernel so as to lessen the danger of the kernels being split. Also, the water serves as a buffer to prevent the nuts from striking the sides of the compartment with such force as would otherwise have the tendency of splitting the kernels.

The speed of rotation of the brush must be such as to insure the proper agitation of the nuts in the compartment, which rotation is in the direction of the arrow 64 (Fig. 3). The nuts have a normal tendency to sink in the water to the bottom of the tank, and by reason of the direction of rotation of the brush, the nuts are circulated about mostly in the right-hand side of the compartment (viewing the machine as in Fig. 3). Thus, as the brush sections 11 revolve, the nuts are first rolled along the screen 8 and as they are carried up out of the water, they drop back against the screen or into the water, or against the next brush section 11. In doing so, the hulls or skins are cracked, and subsequent contact with the water results in the hulls being washed free of the kernels. A few, but not many of the nuts, may be thrown up against the screen 8.1, or against the plate 14. In such cases, the striking of the nuts against these parts results in a cracking of the hulls and a subsequent separation of the hulls and kernels when the nuts fall back into the water.

The hulls or skins have a tendency to float on the water. Therefore, during the rotation of the brush, many of the hulls, perhaps about half, are picked up by the brush sections and thrown with water against the plate 14. These pass through the slots in the plate and are brushed off by the brush 16 and caused to pass out through the slots 19 and 19.1 into the tank 1 below the screen 8. The remaining portion of the hulls are caught between the screen 8 and the ends of the bristles of the brush sections 11, and are forced out through the screen 8. Particularly is this true when the hulls come between the longer outside bristles of the brush sections.

During the rotation of the brush, fresh water is supplied through the inlets 40 and passes out through the discharge outlet 4.1. By virtue of the height of the pipe 4.1, the level of the liquid in the tank 1 is a short distance below the shaft 10. The nuts are kept from accumulating at the ends of the tank by the propeller blades 13, which cause the water and nuts to move toward the middle of the tank.

After the nuts have been churned around sufficiently to insure all of the hulls being removed and separated, the vertical side section 14, 15 and 17 is swung by means of the crank 36 and links 37, into the position shown in dotted outline in Fig. 3. As the brush continues to rotate, the nuts are thrown by the bristles up against the plate 14, which in its inclined position causes the nuts to fall into the chute 3. Water issuing from the end of the branch 48 washes the nuts down along the chute out into the receptacle 33. After the hulled peanuts have all been thrown out of the tank 1, the vertical side section 14, 15, 17 is shifted back into place and another supply of peanuts is introduced into the tank and the operation resumed.

The action of the hulling mechanism may be observed from time to time by lifting back the cover 27.

As the water passes through the reservoir 4, either back to the pump 42 or out through the drain 56, the screens 60, 61, and 62 remove the hulls so that they do not pass out into the sewer and clog it, or back into the tank, in case the circulating pump is in use.

Although but one specific embodiment of this invention has been herein shown and described, it will be understood that numerous details of the construction shown may be altered or omitted without departing from the spirit of this invention as defined by the following claims.

I claim:

1. In a nut-blanching machine, the combination of a tank of arcuate cross section, arranged to contain a quantity of liquid, a screen concentrically arranged within said tank so as to be submerged in the liquid, a cylindrical-shaped brush, comprising a plurality of sector-shaped sections spaced apart axially and radially, journaled in said casing so as to have the ends of the bristles contact with said screen, mechanism for rotating said brush, means for directing nuts into said tank, and means providing a discharge outlet for nuts from said tank.

2. In a nut-blanching machine, the combination of a tank of arcuate cross section, arranged to contain a quantity of liquid, a screen concentrically arranged within said tank so as to be submerged in the liquid, a cylindrical-shaped brush, comprising a plurality of sector-shaped sections arranged in the form of a spiral throughout the length of said tank, the spacing of said sections axially being such that adjacent sections overlap, said brush being journaled in said casing so as to have the ends of the bristles contact with said screen, mechanism for rotating said brush, means for directing nuts into said tank, and means providing a discharge outlet for nuts from said tank.

3. In a nut-blanching machine, the combination of a tank of arcuate cross section, arranged to contain a quantity of liquid, a screen concentrically arranged within said tank so as to be submerged in the liquid, a cylindrical-shaped brush, comprising a plurality of sector-shaped sections spaced apart axially and radially and having the bristles along the edges thereof longer than the bristles along the middle, said brush being journaled in said casing so as to have the ends of the said longer bristles contact with said screen, mechanism for rotating said brush, means for directing nuts into said tank, and means providing a discharge outlet for nuts from said tank.

4. In a nut-blanching machine, the combination of a tank of arcuate cross section, arranged to contain a quantity of liquid, a screen concentrically arranged within said tank so as to be submerged in the liquid, a cylindrical-shaped brush, comprising a plurality of sector-shaped brushes secured together in sets and spaced apart axially, which sets are secured together with the sections radially disposed about a common axis, said brush being journaled in said casing so as to have the ends of the bristles contact with said screen, mechanism for rotating said brush, means for directing nuts into said tank, and means providing a discharge outlet for nuts from said tank.

5. In a nut-blanching machine, the combination of a tank of arcuate cross section, arranged to contain a quantity of liquid, a screen concentrically arranged within said tank so as to be submerged in the liquid, a cylindrical-shaped brush journaled in said casing so as to have the ends of the bristles contact with said screen, mechanism for rotating said brush, means for directing nuts into said tank, agitators located at the ends of said brush for causing a movement of the nuts inwardly toward the middle of said brush, and means providing a discharge outlet for nuts from said tank.

6. In a nut-blanching machine, the combination of a tank of arcuate cross section, arranged to contain a quantity of liquid, a screen concentrically arranged within said tank so as to be submerged in the liquid, a cylindrical-shaped brush, comprising a plurality of sector-shaped sections spaced apart axially and radially, journaled in said casing so as to have the ends of the bristles contact with said screen, mechanism for rotating said brush, means for directing nuts into said tank, a propeller located at each end of said brush and adapted to cause movement of the nuts inwardly toward the middle of said brush, and means providing a discharge outlet for nuts from said tank.

7. In a nut-blanching machine, the combination of a tank for containing liquid, having a semi-circular bottom and vertically disposed sides, a screen concentrically arranged within said tank so as to be submerged in the liquid, a shaft journaled on said tank on an axis concentric with the axis of said semi-circular bottom and said screen, a plurality of sector-shaped brushes secured to said shaft in a spiral relation so as to form a substantially cylindrical brush, said bristles being of a length sufficient to contact with said screen, means for rotating said shaft, a chute arranged at the top of said tank and adapted to direct nuts into said tank, and means providing a discharge outlet for said nuts from said tank.

8. In a nut-blanching machine, the combination of a tank, a screen arranged in the bottom of said tank and spaced away therefrom, a foraminous plate constituting one of the sides of said tank above said screen, a brush movably mounted within said tank and contacting with said screen, a second brush shiftably mounted on the outside of said foraminous plate and contacting with the same, means for actuating brushes, means for directing nuts into said tank, and means providing a discharge outlet for nuts from said tank.

9. In a nut-blanching machine, the combination of a tank, a screen arranged in the bottom of said tank and spaced away therefrom, a vertical side section for said tank, comprising a foraminous plate and imperforate plate spaced away from each other horizontally, means providing communication between the space between said plates and said tank below said screen, a brush movably mounted within said tank and contacting with said screen, a second brush shiftably mounted between said plates and having the bristles thereon contact with said foraminous plate, a member reciprocatingly mounted above said side section, means connecting said member with said second-mentioned brush, and mechanism for actuating said first-mentioned brush and shifting said reciprocating member.

10. In a nut-blanching machine, the combination of a tank, a screen arranged therein, a brush movable relative to said screen, mechanism for causing the relative movement of said screen and brush, means for directing nuts into said tank, a discharge chute arranged at one side of said tank, and a part of the adjacent vertical side of said tank being shiftable so as to open communication between said tank and chute and thereby provide a discharge outlet for nuts from said tank.

11. In a nut-blanching machine, the combination of a tank, a screen arranged therein, a brush movable relative to said screen, mechanism for causing the relative movement of said screen and brush, means for directing nuts into said tank, a discharge chute arranged at one side of said tank, and a part of the adjacent vertical side of said tank being swingably mounted, and means for swinging said part into and out of position to open communication between said tank and said chute and thereby provide a discharge outlet for nuts from said tank.

12. In a nut-blanching machine, the combination of a tank, a screen arranged in the bottom of said tank and spaced away therefrom, a vertical side section for said tank, comprising a foraminous plate and imperforate plate spaced away from each other horizontally, means providing communication between the space between said plates and said tank below said screen, a brush movably mounted within said tank and contacting with said screen, a second brush shiftably mounted between said plates and having the bristles thereon contact with said foraminous plate, means for actuating said brushes, a chute arranged at one side of said tank adjacent to said vertical side section, said side section being swingably mounted, and means adapted to swing said side section into and out of position to open communication between the interior of said tank and said chute so as to provide a discharge outlet for nuts from said tank.

Signed at Chicago this 6 day of Sept., 1919.

JAMES G. KENNEDY.